United States Patent [19]

Reasoner

[11] Patent Number: 5,560,259
[45] Date of Patent: Oct. 1, 1996

[54] DOUBLE-INTERLOCKED ADJUSTABLE PUSH-PULL CONTROL

[75] Inventor: Michael Reasoner, Ortonville, Mich.

[73] Assignee: Teleflex Incorporated, Plymouth Meeting, Pa.

[21] Appl. No.: 527,359

[22] Filed: Sep. 12, 1995

[51] Int. Cl.⁶ .................................................. F16C 1/10
[52] U.S. Cl. ........................................ 74/501.5 R; 74/502
[58] Field of Search ........................... 74/501.5 R, 502, 74/502.4, 502.6; 192/111 R

[56] References Cited

U.S. PATENT DOCUMENTS

| | | | |
|---|---|---|---|
| 3,572,159 | 3/1971 | Tschanz | 74/501 |
| 4,177,691 | 12/1979 | Fillmore | 74/501 P |
| 4,452,097 | 6/1984 | Sunkel | 74/502.4 |
| 4,694,706 | 9/1987 | Lichtenberg et al. | 74/501.5 R |
| 4,799,400 | 1/1989 | Pickell | 74/502.6 |
| 5,161,428 | 11/1992 | Petruccello | 74/501.5 R |
| 5,163,338 | 11/1992 | Sharp et al. | 74/501.5 R |
| 5,220,832 | 6/1993 | Petruccello | 74/501.5 R |
| 5,295,408 | 3/1994 | Nagle et al. | 74/501.5 R |

*Primary Examiner*—Charles A. Marmor
*Assistant Examiner*—Chong H. Kim
*Attorney, Agent, or Firm*—Howard & Howard

[57] ABSTRACT

A motion-transmitting remote control assembly (10) of the type for transmitting motion along a curved path by a flexible core element (20) movably supported in a conduit (12, 14) and adjustment means including inner (16) and outer (18) telescoping members for adjusting the length of the conduit. The assembly is characterized by a pair of identicle locking members (22) retained against axial movement by the outer member (18) and radially movable into a locked position in which the locking members (22) are in interlocking engagement with the outer member (18) and with one another so that each locking member (22) is in gripping engagement with substantially 180 degrees of the circumference of the inner member (16) to prevent relative axial movement between the inner (16) and outer (18) members. Each locking member (22) includes a male projection (26) defining a hook (28) for interlocking engagement with a flange (34) of the other locking member (22) sandwiched against a shoulder (30) of the outer member (16).

14 Claims, 2 Drawing Sheets

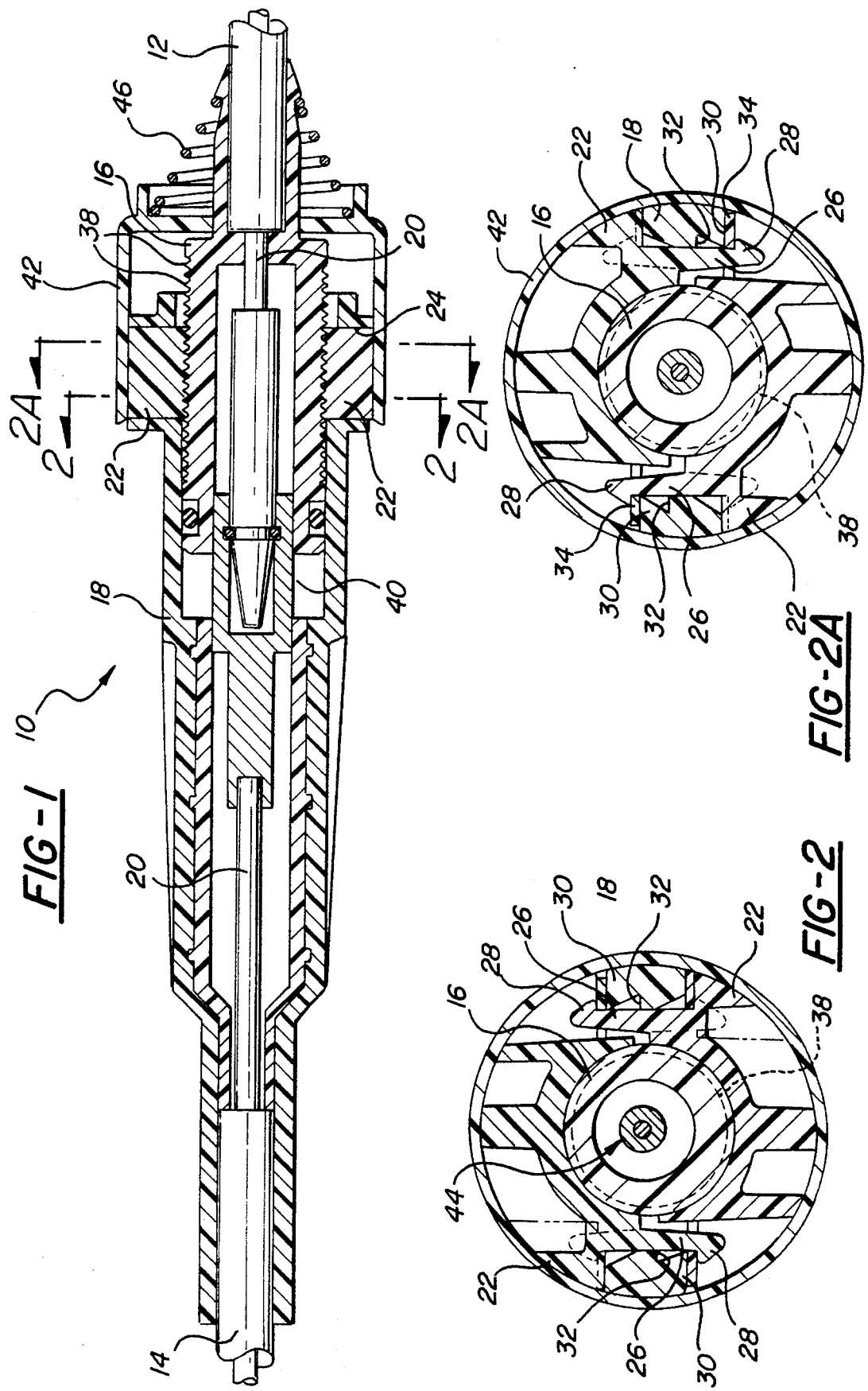

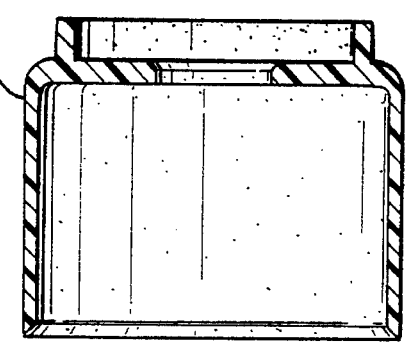
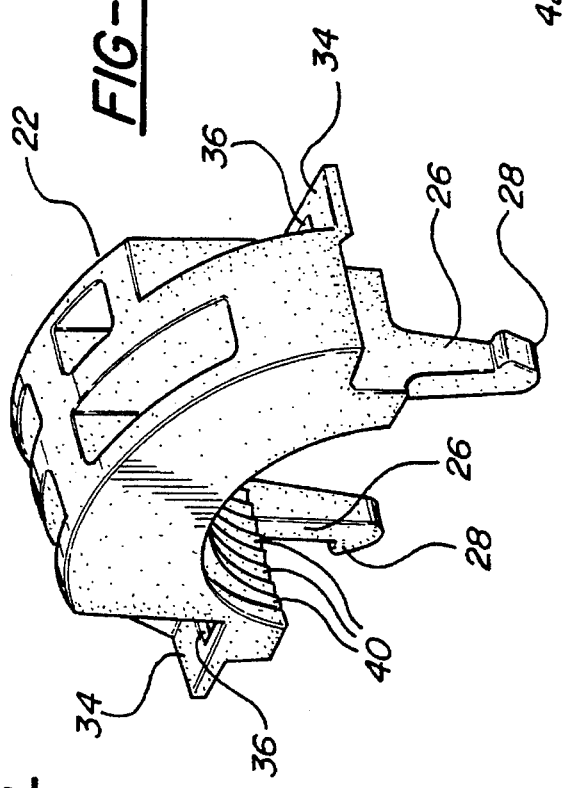
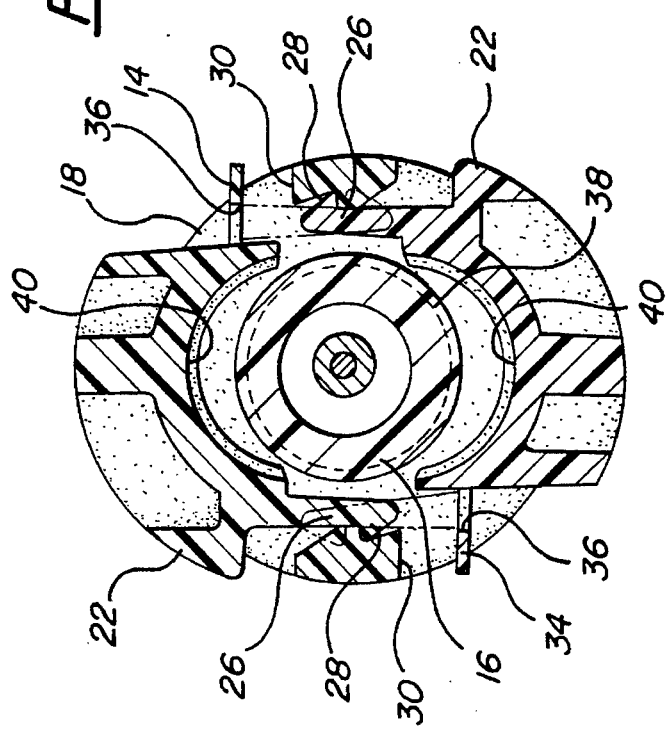

5,560,259

DOUBLE-INTERLOCKED ADJUSTABLE PUSH-PULL CONTROL

TECHNICAL FIELD

The subject invention relates to a moron-transmitting remote control assembly of the type for transmitting motion in a curved path by a flexible motion transmitting core element movably supported in a conduit.

BACKGROUND ART

Such remote control assemblies are used in automobiles to control heaters, vents, accelerators, throttles, parking-brake interlocks, etc. The length of the conduit must be adjustable during installation as the routing and distance between the connection points varies. A manually adjustable assembly is one wherein the length of the conduit changes as two telescoping members interconnect the ends of the conduit and move longitudinally relative to one another during installation to the adjusted position whereupon a locking member is moved to a locking position to interlock the two telescoping members to prevent any change in the length of the conduit. Examples of such assemblies are shown in U.S. Pat. Nos. 3,572,159 to Tschanz; 4,117,691 to Fillmore; 5,161,428 to Petruccello; and 5,178,034 to Reasoner, all assigned to the assignee of the instant invention. An important attribute of such an assembly is the magnitude of the forces the conduit can withstand in the locked position, yet remaining economical to manufacture.

SUMMARY OF THE INVENTION

A motion-transmitting remote control assembly of the type for transmitting motion along a curved path by a flexible core element movably supported in a conduit, and adjustment means including inner and outer telescoping members for adjusting the length of the conduit and characterized by a pair of locking members retained against axial movement by the outer member and radially movable into a locked position in which the locking members are in interlocking engagement with the outer member and overlapping one another radially so that each locking member is in gripping engagement with substantially 180 degrees of the circumference of the inner member to prevent relative axial movement between the inner and outer members.

BRIEF DESCRIPTION OF THE DRAWINGS

Other advantages of the present invention will become readily appreciated as the same becomes better understood by reference to the following detailed description when considered in connection with the accompanying drawings wherein:

FIG. 1 is a cross-sectional view taken along the longitudinal axis of a preferred embodiment of the subject invention;

FIG. 2A is a cross-sectional view taken along line 2A—2A of FIG. 1;

FIG. 2 is a cross-sectional view taken substantially along line 2—2 of FIG. 1;

FIG. 3 is a cross-sectional view similar to FIG. 2 but with the components in the loosely held shipping position;

FIG. 4 is a perspective view of the locking member of the subject invention;

FIG. 5 is a perspective view of the retention skirt utilized in the subject invention; and FIG. 6 is a cross-sectional view of he retention skirt.

DETAILED DESCRIPTION OF PREFERRED EMBODIMENT

A motion-transmitting remote control assembly of the type for transmitting motion along a curved path by a flexible core element is generally shown at 10.

The assembly 10 comprises a conduit which, in turn, includes a first tubular member 12 and a second tubular member 14. The first tubular member 12 is attached to an inner member 16 and the second tubular member 14 is attached to an outer member 18. All of these members are made of plastic and are bonded together as is well known in the art.

A flexible core element 20 is movably supported in the conduit.

An adjustment means includes the inner and outer telescoping members 16 and 18 for adjusting the length of the conduit and is characterized by a pair of locking members 22 retained against axial movement by a transverse guideway 24 in the outer member and are radially movable into a locked position, as shown in FIGS. 1 and 2 in which the locking members are in interlocking engagement with the outer member 18 and overlapping one another radially so that each locking member is in gripping engagement with substantially 180 degrees of the circumference of the inner member 16 to prevent relative axial movement between the inner 16 and outer 18 member. Each of the locking members 22 includes a male projection 26 for the interlocking engagement with the outer member 18. The male projections 26 include a distal end defining a hook 28.

The outer member 18 includes a pair of diametrically opposed locking shoulders 30 for mechanical interlocking engagement with the hooks 28 of the locking members 22 to retain the locking members 22 in the locked position. The outer member 18 also includes a pair of secondary shipping shoulders 32 disposed diametrically on opposite sides of the inner member 16 for mechanical interlocking engagement with the hooks 28 of the locking members 22 to loosely retain the locking members 22 in radially spaced relationship to the inner member 16 to retain the assembly together during shipment (as shown in FIG. 3) and to allow relative axial movement between the inner 16 and outer 18 members during installation and subsequent movement of the locking members 22 to the locked position (as shown in FIG. 2).

Each of the locking members 22 includes a female retention flange 34 having an aperture 36 therein and for resting upon the locking shoulders 30 and interlocking engagement with the hooks 28 whereby the hooks 28 urge the retention flanges 34 into engagement with the locking shoulders 30. In other words, the hooks 28 move through the apertures 36 in the flanges of the opposite locking member 22 and snap over the flanges to hold the flanges tight against the locking shoulders 30.

The locking members 22 are identical and interchangeable and each includes one of the male projections 26 and one of the female retention flanges 34 in side-by-side relationship on the same side or on each diametrically opposite side of the inner member 16. Furthermore, each of the male projections 26 is diametrically opposite one of the female retention flanges 34, as best seen in FIG. 4 and by comparing FIGS. 2 AND 2A. Said another way, each one half of each locking member 22 is the reverse image of the opposite half, i.e., they are the same but not mirror images.

The inner member 16 presents a plurality of teeth 38 extending circumferentially thereabout and spaced axially therealong and the locking members 22 each include teeth 40 for engaging the teeth 38 on the inner member 16. The teeth 40 of each locking member 22 engage approximately one half of the circumference of the teeth 38 on the inner member 16.

A retention skirt 42 is slidably disposed on the inner member 16 for movement to a retention position, shown in FIG. 1, surrounding the locking members 22 to prevent the locking members 22 from moving radially outwardly from the locked position.

The core element includes first and second elements 20 connected together by connection means 44 disposed within the inner 16 and outer 18 members. The connection means includes male and female members which snap together during assembly before the inner and outer members 16 and 18 are telescoped together to the adjusted position to determine the overall length of the conduit, after which the locking members 22 are moved radially inwardly and locked over the locking shoulders, the retention flanges and interlocked together.

A spring 46 interacts between the inner member 16 and the retention skirt 42 to bias the retention skirt 42 to the retention position, as shown in FIG. 1.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A motion-transmitting remote control assembly (10) of the type for transmitting motion along a curved path by a flexible core element, said assembly comprising:

a conduit (12, 14);

a flexible core element (20) movably supported in said conduit;

adjustment means including inner (16) and outer (18) telescoping members for adjusting the length of said conduit and characterized by a pair of locking members (22) retained against axial movement by said outer member (18) and radially movable seperately as separate members into a locked position in which each of said locking members (22) is in radially interlocking engagement with said outer member (18) and overlapping one (16) another (18) radially so that each locking member (22) is in gripping engagement with substantially 180 degrees of the circumference of said inner member (16) to prevent relative axial movement between said inner (16) and outer (18) members.

2. An assembly as set forth in claim 1 wherein each of said locking members (22) includes a male projection (26) for said interlocking engagement with said outer member (16).

3. An assembly as set forth in claim 2 wherein each of said male projections (26) includes a distal end defining a hook (28).

4. An assembly as set forth in claim 3 wherein said outer member (18) includes a pair of diametrically opposed locking shoulders (30) for mechanical interlocking engagement with said hooks (28) of said locking members (22) to retain said locking members (22) in said locked position.

5. An assembly as set forth in claim 4 wherein said outer member (18) also includes a pair of secondary shipping shoulders (32) disposed diametrically on opposite sides of said inner member (16) for mechanical interlocking engagement with said hooks (28) of said locking members (22) to loosely retain said locking members (22) in radially spaced relationship to said inner member (16) to retain the assembly together during shipment and to allow relative axial movement between said inner (16) and outer (18) members during installation and subsequent movement of said locking members (22) to said locked position.

6. An assembly as set forth in claim 5 wherein each of said locking members (22) includes a female retention flange (34) for resting upon said locking shoulders (34) and interlocking engagement with said hooks (28) whereby said hooks (28) urge said retention flanges (34) into engagement with said locking shoulders (30).

7. An assembly as set forth in claim 1 wherein said locking members (22) are identical and interchangeable.

8. An assembly as set forth in claim 6 including one of said male projections (26) and one of said female retention flanges (34) in side-by-side relationship on each diametrically opposite side of said inner member (16).

9. An assembly as set forth in claim 8 wherein each of said male projections (26) is diametrically opposite one of said female retention flanges (34).

10. An assembly as set forth in claim 9 wherein said inner member (16) presents a plurality of teeth (38) extending circumferentially thereabout and spaced axially therealong and said locking members (22) each include teeth (40) for engaging said teeth (38) on said inner member (16).

11. An assembly as set forth in claim 10 wherein said teeth (40) of each locking member (22) engage approximately one half of the circumference of the teeth (38) on the inner member (16).

12. An assembly as set forth in claim 11 wherein said conduit includes a first flexible tubular member (12) connected to said inner member (16) and a second flexible tubular member (14) connected to said outer member (18), a retention skirt (42) slidably disposed on said inner member (16) for movement to a retention position surrounding said locking members (22) to prevent said locking members (22) from moving radially outwardly from said locked position.

13. An assembly as set forth in claim 12 wherein said core element (20) includes first and second elements connected together by connection means (44) disposed within said inner (16) and outer (18) members.

14. An assembly as set forth in claim 12 including a spring (46) interacting between said inner member (16) and said retention skirt (42) to bias said retention skirt (42) to said retention position.

* * * * *